(12) United States Patent
Mahajan et al.

(10) Patent No.: US 10,097,599 B2
(45) Date of Patent: Oct. 9, 2018

(54) GENERATION OF COMPLETE COMMUNICATION LOGS

(71) Applicant: Avaya Inc., Basking Ridge, NJ (US)

(72) Inventors: Hrishikesh Ulhas Mahajan, Pune (IN); Jay Amlani, Pune (IN); Ananda HP, Pune (IN); Arun Dutt Patel, Pune (IN); Puneet Kumar, Pune (IN)

(73) Assignee: Avaya, Inc., Basking Ridge, NJ (US)

( * ) Notice: Subject to any disclaimer, the term of this patent is extended or adjusted under 35 U.S.C. 154(b) by 147 days.

(21) Appl. No.: 14/834,854

(22) Filed: Aug. 25, 2015

(65) Prior Publication Data

US 2017/0063938 A1 Mar. 2, 2017

(51) Int. Cl.
*G06F 15/16* (2006.01)
*H04L 29/06* (2006.01)
*H04L 12/18* (2006.01)

(52) U.S. Cl.
CPC ........ *H04L 65/403* (2013.01); *H04L 12/1813* (2013.01)

(58) Field of Classification Search
CPC .................................................. H04L 65/1006
USPC ....................................................... 709/217
See application file for complete search history.

(56) References Cited

U.S. PATENT DOCUMENTS

| 8,332,760 B2 * | 12/2012 | Keohane | G06Q 10/107 709/204 |
| 2015/0046597 A1 * | 2/2015 | Dolph | H04L 65/1069 709/227 |

* cited by examiner

*Primary Examiner* — Wing F Chan
*Assistant Examiner* — Joseph Maniwang (57) ABSTRACT

Disclosed herein are systems, methods, and software to provide enhanced communication logs to user systems in a conferenced communication. In one example, a method of providing enhanced communication logs includes initiating a communication between at least two end user systems, and obtaining communication state information for the at least two end user systems. The method further provides extending the communication to a third end user system, and obtaining supplementary communication state information for the third end user system. The method also includes providing communication details to the end user systems of the communication based on the communication state information and the supplementary communication state information.

20 Claims, 9 Drawing Sheets

| COMM IDS 610 | SYSTEM INFO 620 | SYSTEM INFO 621 | SYSTEM INFO 622 | SYSTEM INFO 623 |
|---|---|---|---|---|
| COMM ID 611 | INFO | INFO | INFO | INFO |
| COMM ID 612 | INFO | INFO | INFO | |
| COMM ID 613 | INFO | INFO | | |
| .... | .... | .... | .... | .... |
| COMM ID 614 | INFO | INFO | | |

DATA STRUCTURE 600

GENERATION OF COMPLETE COMMUNICATION LOGS

TECHNICAL BACKGROUND

Many communication systems allow participants at a plurality of end user devices to contribute information to a meeting without the users being in the same physical location. These systems may facilitate audio communications, video communications, or both that allow participants to interact in real-time about particular ideas and topics. The communication systems may allow users to forward communications to secondary end user devices, invite additional end user devices to join an existing communication, and provide similar functionality to initiate the required communication.

In many communication systems, communication summary information may be maintained locally on each of the devices as a communication log, indicating devices that have been directly contacted, devices from which communications have been directly received, communication times, and other similar information. Although the communication log may provide information about direct communications to and from a device, the local information may fail to provide information about other devices involved in a conferenced communication. Further, if a first device contacts a second device, the local communication log on the first device may be unable to account for redirects or forwarding that can be used to transition a communication to a third device in place of the second device. This prevents users of the first device from accurately determining the various devices and, in some cases, personnel involved in a conferenced communication.

OVERVIEW

Examples disclosed herein offer enhancements for providing complete communication logs to user systems in a conferenced communication. In one implementation, a method of providing enhanced communication logs includes initiating a communication for at least a first end user system and a second end user system. The method further provides obtaining communication state information for the first end user system and the second end user system, and extending the communication a third end user system. The method also includes obtaining supplementary communication state information for the third end user system, and transferring communication details to the first end user system, the second end user system, and the third end user system based on the communication state information and the supplementary communication state information.

In another example, a method of operating a communication server to provide enhanced communication logs includes identifying a communication for at least a first end user system and a second end user system, and obtaining communication state information for the first end user system and the second end user system. The method further provides identifying an extension of the communication to a third end user system, and obtaining supplementary communication state information for the third end user system. The method also includes transferring communication details to the first end user system, the second end user system, and the third end user system based on the communication state information and the supplementary communication state information.

In a further implementation, an apparatus to provide enhanced communication logs includes one or more computer readable media, and processing instructions stored on the one or more computer readable media that direct a processing system to identify a communication for at least a first end user system and a second end user system. The processing instructions also direct the processing system to obtain communication state information for the first end user system and the second end user system, and identify an extension of the communication to a third end user system. The processing instructions further direct the processing system to obtain supplementary communication state information for the third end user system, and transfer communication details to the first end user system, the second end user system, and the third end user system based on the communication state information and the supplementary communication state information.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The following description and associated figures teach the best mode of the invention. For teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

The various examples disclosed herein provide for enhanced communication logs in a communication system. In particular, organizations, such as enterprises, companies, and the like may employ a variety of end user systems that allow personnel associated with the end user systems to communicate in real-time. These end user systems may communicate via session initiation protocol (SIP), H.323, public switched telephone network (PSTN), Q signaling (QSIG), or a variety of other protocols that allow two or more end user systems to communicate.

In the present example, a communication server is provided that can manage communication state information for the various communications within the network. This communication state information may be used to provide more complete communication logs at the individual end user systems. Specifically, rather than exclusively maintaining information about locally outgoing and incoming communications on a user system, the communication server may provide communication details to the user system about all of the systems involved in each communication.

For example, two end user systems may initiate a communication over a SIP network, and information about the communication may be maintained within a communication server. This information about the communication may include identifiers or extensions associated with the two end user systems, a time stamp for the communication, usernames or other identifiers associated with the users of the two end systems, or any other similar information. During the communication, one of the end user systems may request a third end user system to join the communication. To ensure that all end user systems are provided with accurate communication state information, the communication server may identify communication state information for the third end user system, and provide information about the third end user system to the other two end user systems involved in the communication. This information may include who invited the third end user system to the conference, the time the third end user system was added to the conference, an identifier or extension associated with the third end user system, a name of a user associated with the third end user system, and the like. Similarly, communication state information may be provided to the third end user system, identifying the first two end user systems in the communication, time stamp information associated with the communication between the first two end user systems, and the like, allowing each of the end user systems to have access to a complete summary of the communication.

Although demonstrated in the previous example with three end user systems, it should be understood that similar operations might be provided with four or more end user systems. For example, if a fourth system were added to the communication described above, communication state data may be determined for the fourth system and provided to the other systems involved in the communication. Similarly, communication details may be provided to the fourth system regarding the communication between the preexisting three end user systems.

Figure 1:
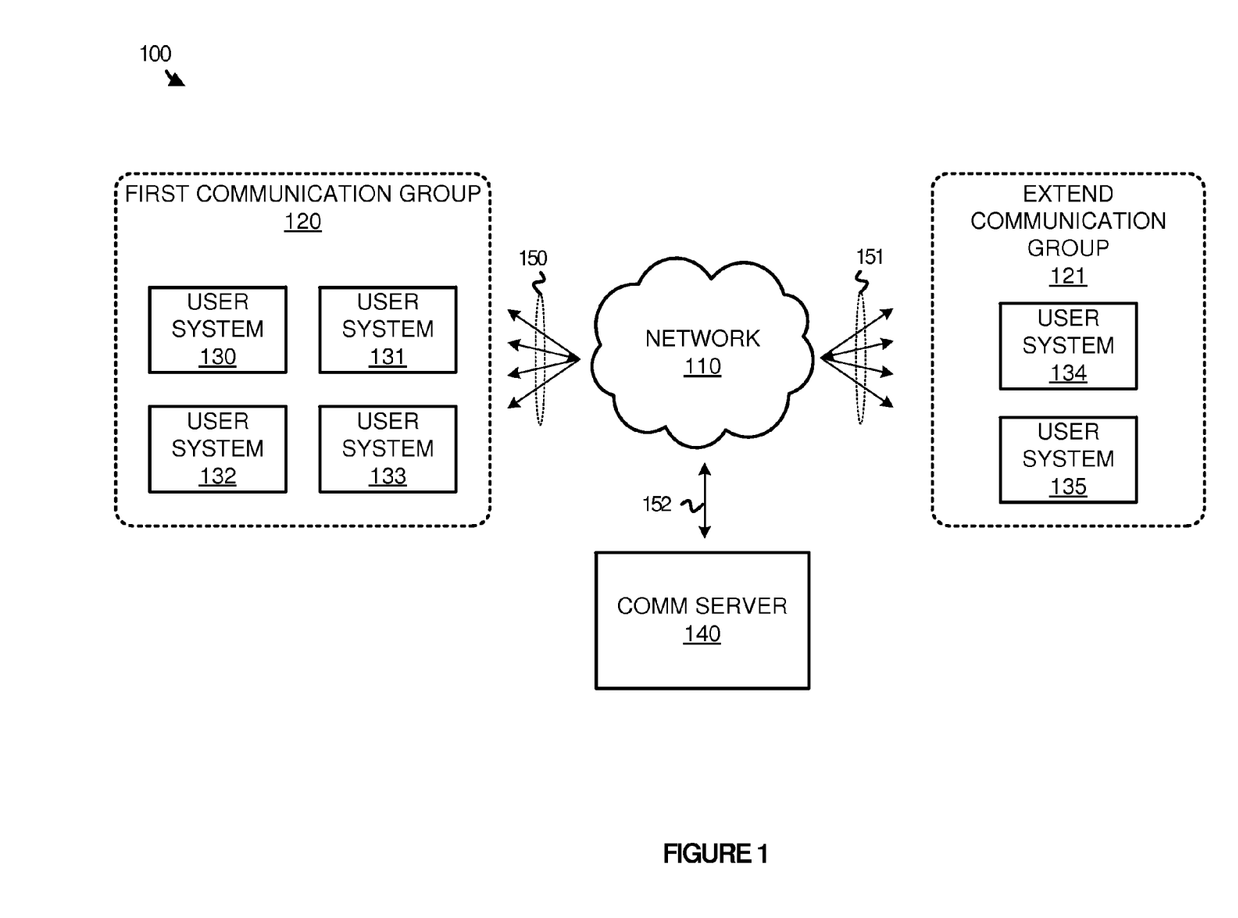
FIG. 1 illustrates a communication system to exchange and maintain enhanced communication logs.

To further demonstrate the implementation of enhanced communication logs, FIG. 1 is provided. FIG. 1 illustrates a communication system 100 to exchange and maintain enhanced communication logs for end user systems. Communication system 100 includes network 110, first communication group 120, extend communication group 121, and communication (comm) server 140. First communication group 120 includes user systems 130-133, and extend communication group 121 includes user systems 134-135. First communication group, extend communication group 121, and communication server 140 communicate over communication links 150-152.

In operation, first communication group 120 initiates a communication over network 110. This communication may comprise a SIP communication, an H.323 communication, a PSTN communication, or some other similar communication. The communication may include audio communications, video communications, or some other similar type of communication that allow participants to interact in real-time. In some implementations, the end user devices may further communicate documents, images, and the like to the other systems in the conference.

During the communication of first communication group 120, communication state information for user systems 130-133 is maintained by communication server 140. This information may include identifiers for the systems involved in the communication, time stamps for when each of the systems joined the communication, information about how the individual systems joined the communication, as well as other similar communication state information for user systems 130-133. Although illustrated with four systems in first communication group 120, it should be understood that first communication group 120 could comprise any group of two or more systems.

As the communication persists for first communication group 120, the communication may be extended to extend communication group 121. Extend communication group 121 includes user systems 134-135, which may comprise systems that are added to the communication of first communication group 120, may comprise systems that act as forwarding points for at least two of the systems in user system 130-133, or may comprise some other type of extension group for the communication. When a system is added to the communication from extend communication group 121, communication server 140 identifies communication state information related to the new system and relays information about the new system to other systems in the communication. This communication state information may include an identified for the new system, a time stamp for when the new system was added to the communication, a username associated with the new system, information about how the device was added to the communication, or any other similar information. Similarly, communication server 140 may provide communication state information about remaining devices in first communication group 120, to the new system. This communication state information may include identifiers for the devices already involved in the communication, time stamps for the communication, users associated with the user systems, or any other similar information. Once the information is provided to the systems, the systems may update local communication logs to reflect the totality of systems involved in the communication.

Figure 2:
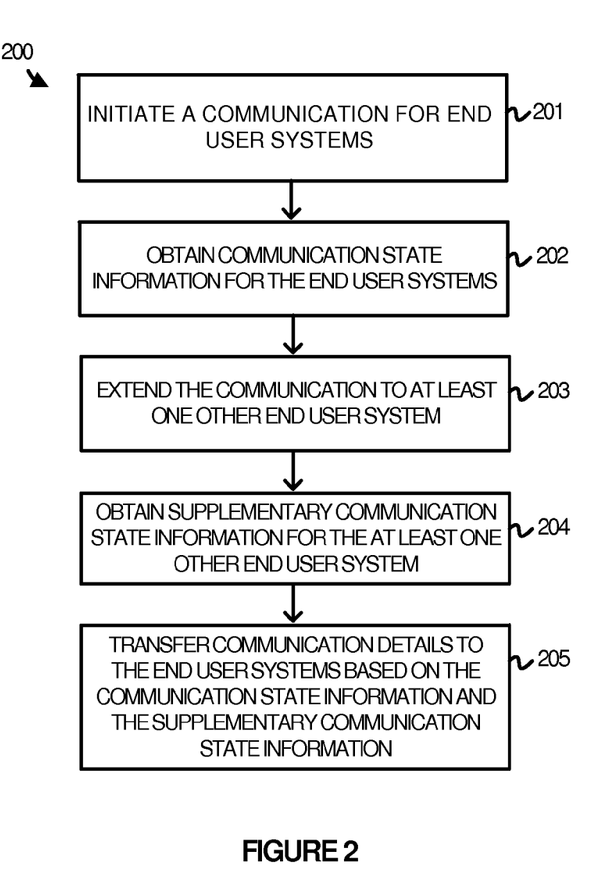
FIG. 2 illustrates a method of operating a communication system to provide enhanced communication logs to end user systems.

Referring now to FIG. 2 to further demonstrate the operation of communication system 100. FIG. 2 illustrates a method 200 of operating a communication system to provide enhanced communication logs to end user systems. The operations of FIG. 2 are referenced parenthetically in the description below.

As described in FIG. 1, multiple end user systems may communicate over a network to provide conferencing solutions for participants at the end user systems. To manage the communication state information for the communications across the network, a communication server, such as communication server 140, may be communicatively coupled to the network that can monitor communication state information for connecting systems. In the example of FIG. 2, method 200 for providing enhanced communication logs includes initiating a communication for at least two end user devices (201), and obtaining communication state information for the end user systems (202). This communication may include a voice communication, a video communication, or both, and may comprise a SIP communication, a H.323 communication, a PSTN communication, or some other networked communication. Referring to FIG. 1, user systems 130-133 initiate a communication over network 110, and communication state information is obtained for the various user systems at communication server 140. This information may include which system or systems initiated the communication with the other systems, identifiers for each of the systems in the communication, time stamps for the communication, and the like.

Once the communication is initiated, the method further provides extending the communication to at least one other end user system (203), and obtaining supplementary communication state information for the at least one other end user system (204). This extension of the communication may include adding a new system to the communication, transitioning or forwarding the communication from a first system associated with the communication to a second end user system, or some other similar extend operation to a new end user system. In the example of FIG. 1, the communication for end user systems 130-133 is extended to end user systems 134-135. To extend the communication, a user in first communication group 120 may invite the new user systems to the communication, may forward the communication from a device in the first communication group to the new user systems, or the new user system may request to join the existing communication.

After obtaining the supplementary communication state information for the at least one other end user system, method 200 includes transferring communication details to the end user systems based on the communication state information and the supplementary communication state information (205). This transferring of communication details may include providing all preexisting devices in the communication with details and information about new devices in the communication, and providing the new user systems with details and information about systems that were preexisting in the communication.

For example, referring to communication system 100, if user system 130 invited user systems 134-135 to join the communication. User systems 130-133 may be provided with communication details about user systems 134-135. This information may include identifiers or telephone numbers associated with the user systems, time stamps for when the systems were added to the communication, information about which systems were responsible for adding the new systems to the communication, or other similar information. At the same time, communication details may be provided to user systems 134-135 regarding the devices already participating in the communication. In particular, user systems 134-135 may be provided with identifiers or telephone numbers associated with user systems 130-133, time stamps for when user systems 130-133 joined the communication, information about how each of user systems 130-133 were added to the communication, or any other similar information about user systems 130-133.

Although illustrated in the present example with a centralized communication server 140, it should be understood that in some implementations, the communication server might comprise a distributed process that can be employed on each of the devices. For example, in a peer-to-peer communication system, a communication server would not be possible. Accordingly, as more systems are added to a communication, each of the systems may record additional state information for the communication, and share the information with any new connecting devices.

Figure 3:
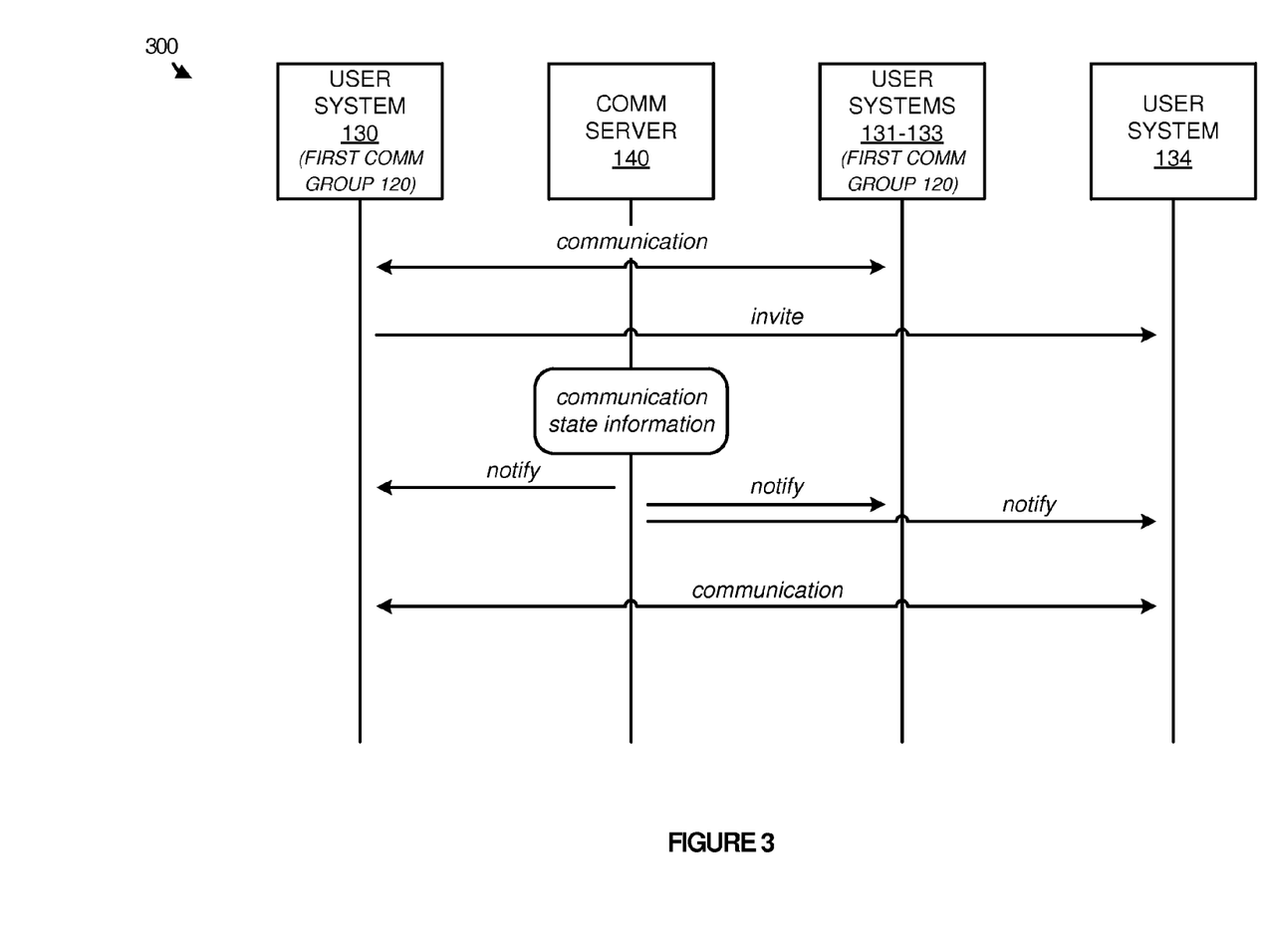
FIG. 3 illustrates a timing diagram to add a new user system to a preexisting communication.

Referring to FIG. 3, FIG. 3 illustrates a timing diagram 300 to add a new user system to a preexisting communication. Timing diagram 300 includes elements from communication system 100 including user systems 130-133 that correspond to first communication group 120, communication server 140, and user system 134.

In operation, user systems 130-133 initiate a communication over a communication network to form first communication group 120. As the communication is initiated, communication server 140 obtains communication state information for each system in user systems 130-133. This communication state information may be retrieved from the user systems involved in the communication, or may be derived, at least in part, by communication server 140. For example, communication server 140, which may act as a router and/or distribution service for the communication, may identify each of the devices as they are joining the communication, and may store information such as the time that the devices joined the communication, how the device joined the communication, and the like.

Once the communication is initiated for first communication group 120, user system 130 initiates an invite to allow user system 134 to join the communication. In response to receiving the invite, user system 134 may accept the invitation and join the preexisting communication. After the invite is accepted, communication server 140 may identify communication state information for user system 134, and notify the various systems in the communication of the current state of the communication. This notification may include providing first communication group 120 with information about connecting user system 134 and, likewise, providing user system 134 with information about user systems in first communication group 120. In some implementations, by providing the information to the end user systems, the end user systems may update their communication logs, allowing participants at the systems to determine which devices were added, forwarded, or terminated during the course of the communication. Using the present example, user systems 130-133 may be provided with information that user system 130 added user system 134 to the conferenced communication, and may be provided with a time stamp of when the addition occurred.

Figure 4:
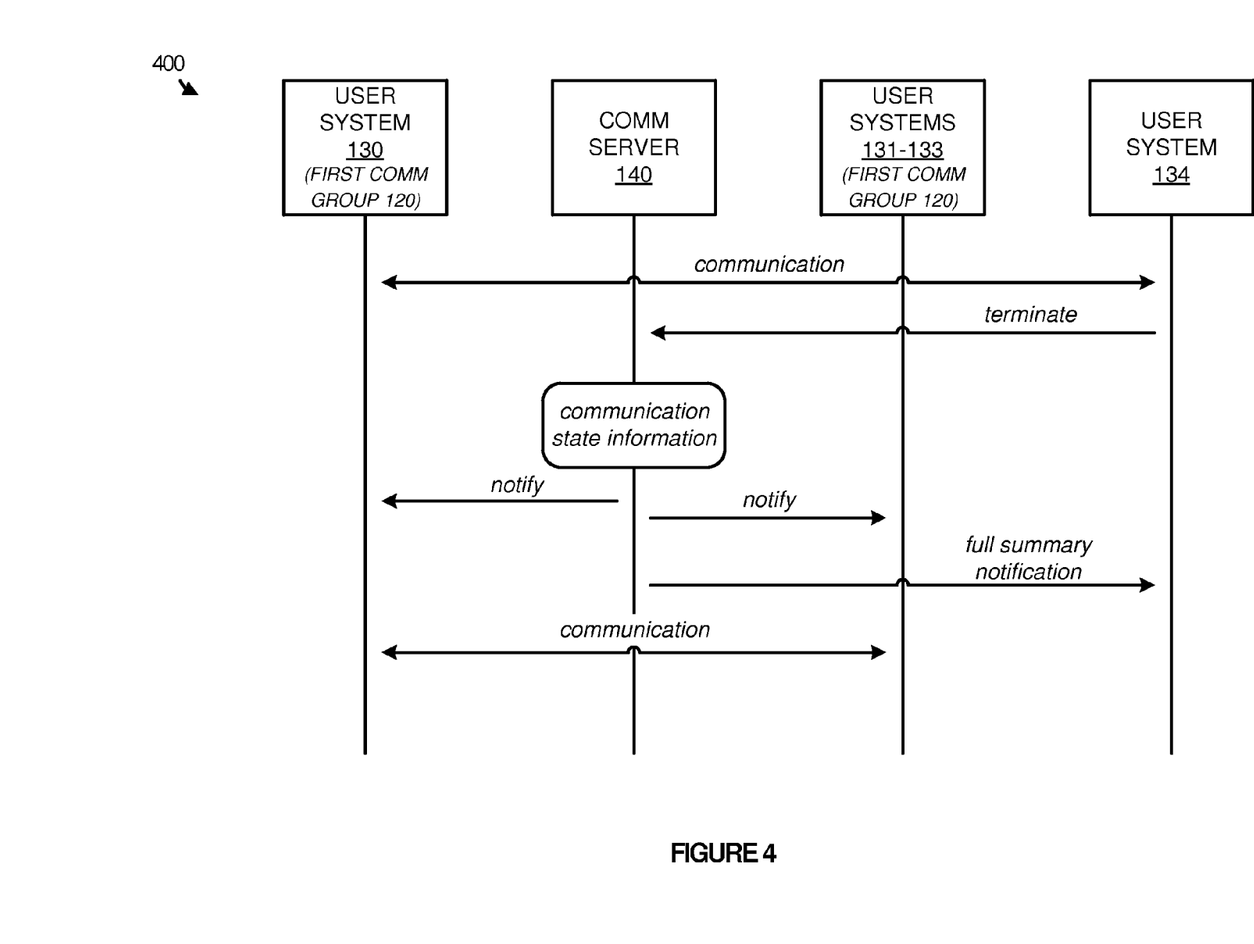
FIG. 4 illustrates a timing diagram of terminating a user system in a communication.

FIG. 4 illustrates a timing diagram 400 of terminating a user system in a communication. Timing diagram 400 is a continuation of the scenario represented in FIG. 3, and includes user systems 130-133, which correspond to first communication group 120, communication server 140, and user system 134.

In the present example, user system 134 has been added to the communication for first communication group 120 and corresponding user systems 130-133. During the communication, user system 134 leaves or terminates the communication, and transfers a notification to communication server 140 indicating the termination. In response to the indication, communication server 140 may again identify communication state information for the communication, including information about which device is leaving the communication and the time stamp for when the device is leaving the communication. Based on the newly derived communication state information, communication server 140 may notify the various end user systems of the status of the communication. The notification to user systems 130-133 may include a notification that user system 134 is no longer involved in the conference, and a time stamp for when the connection was terminated, whereas the notification supplied to user system 134 may provide information about the total duration of the communication for user system 134 to complete the communication log for user system 134.

In some implementations, communication server 140 may provide a configuration option message to user system 134, allowing a user associated with the end system to select whether or not to update a local communication log with information from communication server 140. For example, if user system 130 invited user system 134 to the conferenced communication, user system 134 may initially have a single record of the incoming communication from user system 130, but fail to identify user systems 131-133. At the end of the communication, when user system 134 disconnects from the communication, communication server 140 may provide an option on whether user system 134 would prefer a complete communication log for all systems involved in the communication. If the user declines the communication log, then the log on user system 134 may retain the information gathered locally at the device. However, if the user accepts the update notification, user system 134 may update the communication log locally on the device to reflect information about other devices in the conference. As a result, although user systems 131-133 never directly initiated a communication with user system 134, user system 134 may have a record of the various systems involved in the communication.

In at least one implementation, this transfer of the configuration option message from the communication server may be beneficial to wireless communication devices, such as smartphones and tablets. In that example, communication server 140 may only provide communication log information to the wireless device when the communication is completed rather than periodically throughout the communication. Once the communication is completed, communication server 140 may provide the wireless device with full communication log for the communication, which includes communication duration, start time, end time, and the systems involved in the communication.

Figure 5:
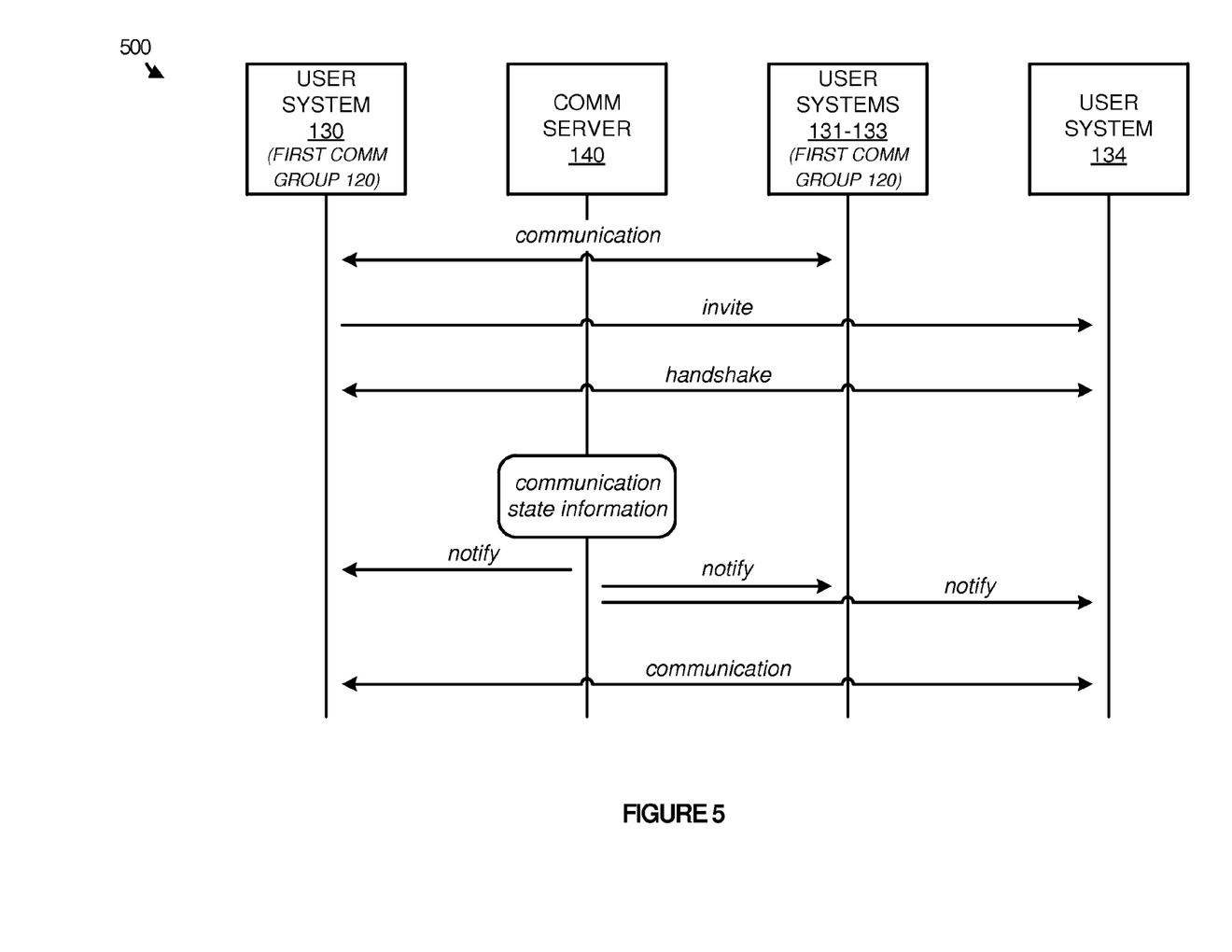
FIG. 5 illustrates a timing diagram for managing communication log data when adding a new device to a communication.

Turning to FIG. 5, FIG. 5 illustrates a timing diagram 500 for managing communication log data when adding a new device to a communication. Timing diagram 500 includes operations similar to those discussed above with respect to FIG. 3, and includes user systems 130-133, which correspond to first communication group 120, communication server 140, and user system 134.

As described previously, first communication group 120 with user systems 130-133 initiate a communication via network 110. During the communication, user system 130 initiates an invite to connect user system 134 to the communication. Once the invite is received, a handshake may be performed between user system 134 and one or more of the systems already involved in the communication. This handshake procedure allows user system 134 specify, either through settings or a user input, whether it is desired to transfer and receive information to summarize and generate a complete communication log. For example, if user system 134 desired to remain anonymous on the communication, the handshake procedure may prevent data about the addition of user system 134 to be provided to user systems 131-133 in the communication. However, because user system 134 was added to the communication user system 130 may maintain identifiers for user system 134, a time stamp for when user system 134 was added to the communication, or other similar information. Further, in some implementations, although user system 134 may prevent the transfer of data to all devices in the communication, communication server 140 may notify other systems in the communication that a device was added to the communication without identifier information for the new device.

However, if user system 134 permits the collection of communication state information, communication server 140 may obtain information corresponding to user system 134 upon completion of the handshake. Once the communication state information is obtained by communication server 140, communication server 140 may notify the systems in the communication of the current state, including an identifier for user system 134, a time stamp for when user system 134 was added to the communication, and other similar information for user system 134. Although depicted in the timing diagram as initiating a handshake procedure for new systems of the communication, it should be understood that the handshake process is optional. For example, in some implementations, an organization may mandate that all devices exchange communication state information to complete communication logs on the individual systems.

Figure 6:
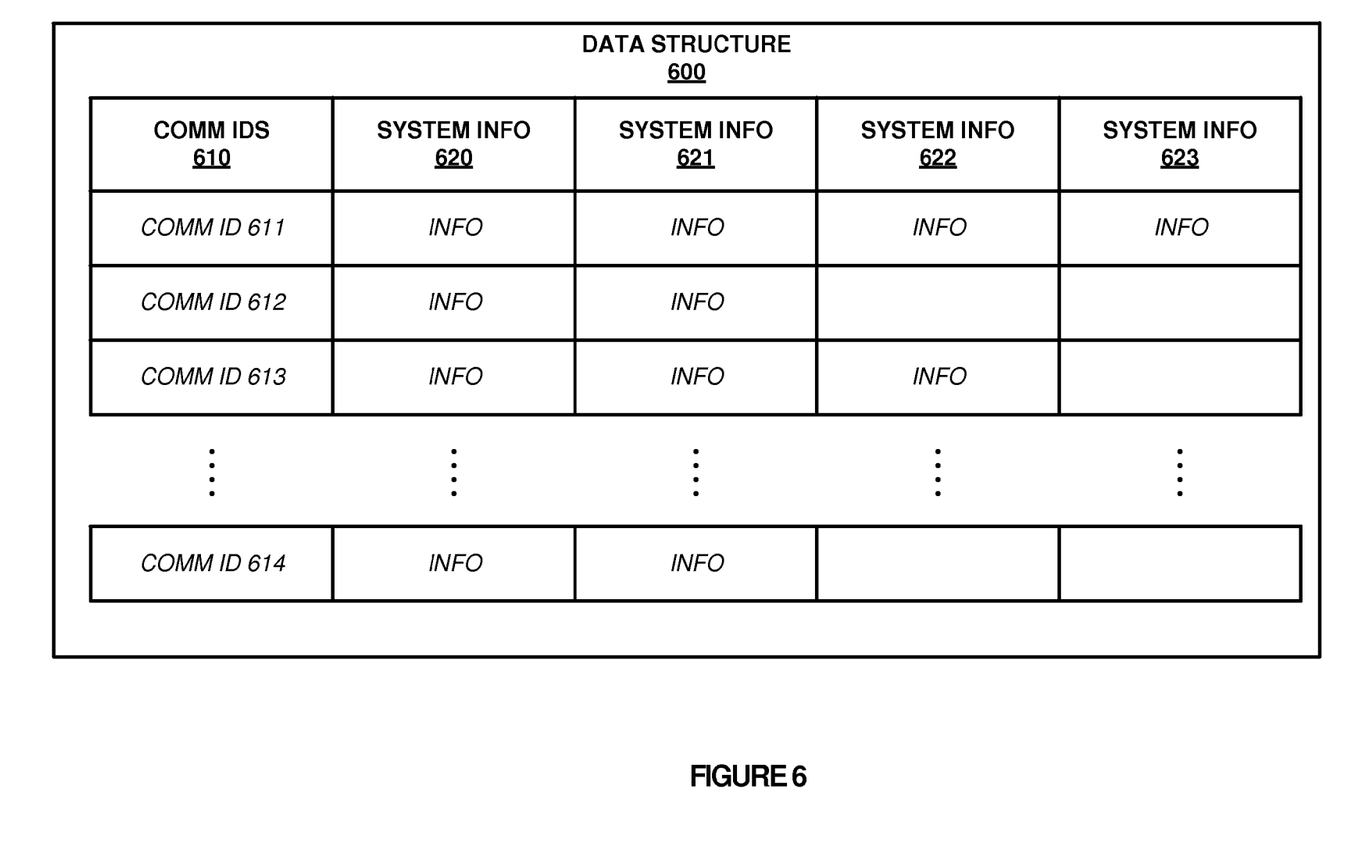
FIG. 6 illustrates a data structure to manage communication state information for devices in a conferenced communication.

FIG. 6 illustrates a data structure 600 to manage communication state information for devices in a conferenced communication. Data structure 600 is representative of a data structure that may be maintained in communication server 140 to maintain communication state information for multiple communications. Data structure 600 is illustrated as a table in the present instance, but it should be understood that information might be stored in one or more linked lists, arrays, or any other similar data structures, including combinations thereof.

In the present example, data structure 600 includes communication identifiers (IDs) 610 and system information (info) 620-623. Communication identifiers 610 may include any identifier, such as a collection of letters, numbers, or some other identifier capable of identifying a communication. System information 620-623 may include various communication data for the communication including, but not limited to, an identifier for the device in the communication, an identifier for a user associated with the device, a time stamp for when the device was added to the communication, or any other similar information.

In operation, a communication server may be used to collect and provide communication state information to connecting end user systems. In particular, data structure 600 may be updated as devices are added to communications, and may be used to provide communication details to update communication logs on connected devices. For example, in the communication represented by communication ID 613, two devices may initially be involved in the communication, which are represented by the information in system information 620-621. This information may include when the communication was initiated, identifiers for the user systems, identifiers for any users associated with the user systems, or any other similar information.

During the communication, a device may be added to the communication and information about the new device may be added to data structure 600. Here, the information for the new device is represented in system information 622 for communication ID 613. This information may include time stamp information for when the system was added to the communication, identifier information for the new user system, identifier information for a user of the new user system, or other similar information. As the information is collected for data structure 600, the communication server may provide the collected information to the connected devices in each communication. Accordingly, each end user system may receive information about all devices involved in the communication. Once the information is received by the device, the device may update or supplement local communication logs on the device to include the various systems of the communication.

Figure 7:
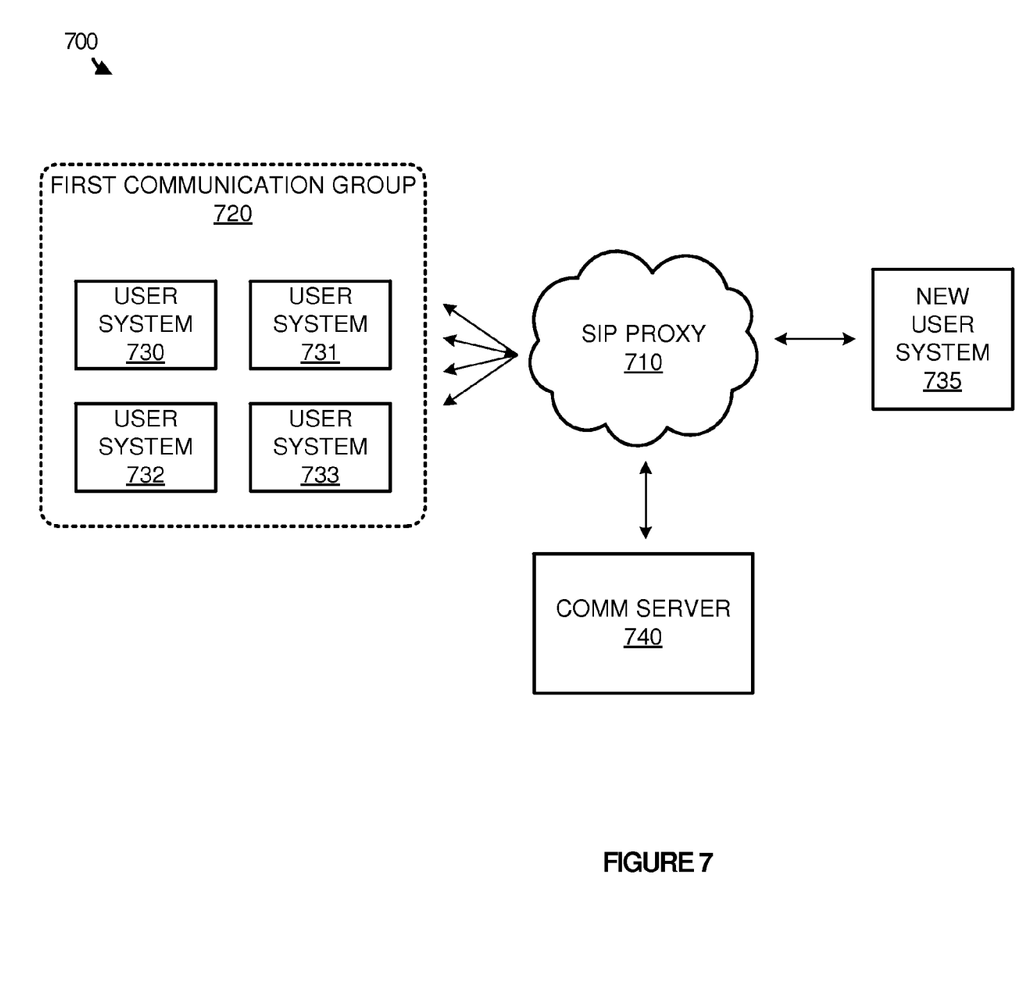
FIG. 7 illustrates a communication system to exchange and maintain enhanced communication logs.

FIG. 7 illustrates a communication system 700 to exchange and maintain enhanced communication logs. Communication system 700 is an example of a SIP communication system, although it should be understood that similar operations may be applied to H.323, PSTN, and other similar communication systems. Communication system 700 includes first communication group 720, SIP proxy 710, new user system 735, and communication server 740. SIP proxy 710 is used to route requests to end user locations, authenticate and authorize users for services, implement provider call-routing policies, and other similar operations for the communication network.

In operation, user systems 730-733 initially communicate via SIP proxy 710 to form first communication group 720. During the communication, communication server 740 monitors and maintains communication status information for the communication, which can be provided to the individual systems involved in the communication to complete a log for the communication. Referring to the example in FIG. 7, the communication for first communication group 720 is to be extended to new user system 735. This extension may occur as a result of forwarding from one of user systems 730-733 to new user system 735, an invite from one of user systems 730-733, a request to join the conference by new user system 735, or some other extension mechanism.

As the communication is extended to new user system 735, communication server 740 identifies that the extension of the communication and obtains supplementary communication state information related to the new user system. This supplementary communication state information may include an identifier for new user system 735, an identifier of the user associated with new user system 735, a time stamp for when the communication was initiated, an identifier for the user system in first communication group 720 that extended the communication, or any other similar information. To obtain the information, communication server 740 may monitor the communications over SIP proxy 710, may receive updates from the user systems involved in the communication, or may receive the information in any other similar manner.

Once the communication state information and the supplementary communication state information is received by communication server 740, communication server 740 may transfer communication details to the end user systems of the communication based on the collected communication state information. For example, if user system 730 invited new user system 735 to the conferenced communication, user systems 731-733 may not have a record of the invite or that new user system 735 was ever involved in the communication. However, when communication server 740 relays the communication details to the user systems involved in the communication, each of the end systems may identify that new user system 735 was added to the communication, that user system 730 invited new user system 735 to the communication, the time stamp for when new user system was added to the communication, and other information about the communication.

In some implementations, to provide the information to the various end user systems, communication server 740 may be configured to update an XML content publish message. This XML content publish message may provide any of the communication details required by the end user systems to update or supplement the communication logs with information about other systems in the communication. Accordingly, even if user system 730 invited user system 735 to the communication, user systems 731-733 may have records of the invite and participation of new user system 735.

Although illustrated in the present example as a SIP communication, it should be understood that other similar conferenced communication protocols may be used that provide similar operations. These communication protocols may include H.323, PSTN, and other similar protocols. Further, despite being illustrated in FIG. 7 with a communication server to distribute the communication details to end user systems, it should be understood that in some implementations the operations of communication server 740 may be distributed across the one or more end user systems. In particular, rather than collecting the data at a centralized server location, each of the systems may be responsible for collecting at least a portion of the communication status data, and transferring the data to one or more other user systems to provide an enhanced communication log for each of the systems. For example, if user system 730 invited new user system 735 to the communication, user system 730 may provide new user system 735 with communication details for the current conference, including information about user systems 731-733. Further, in response to the invite, new user system 735 may provide user systems 730-733 with information about the new device, including an identifier for the new system, an identifier for a user of the system, a time stamp for when the device was introduced to the communication, or any other similar information.

Figure 8:
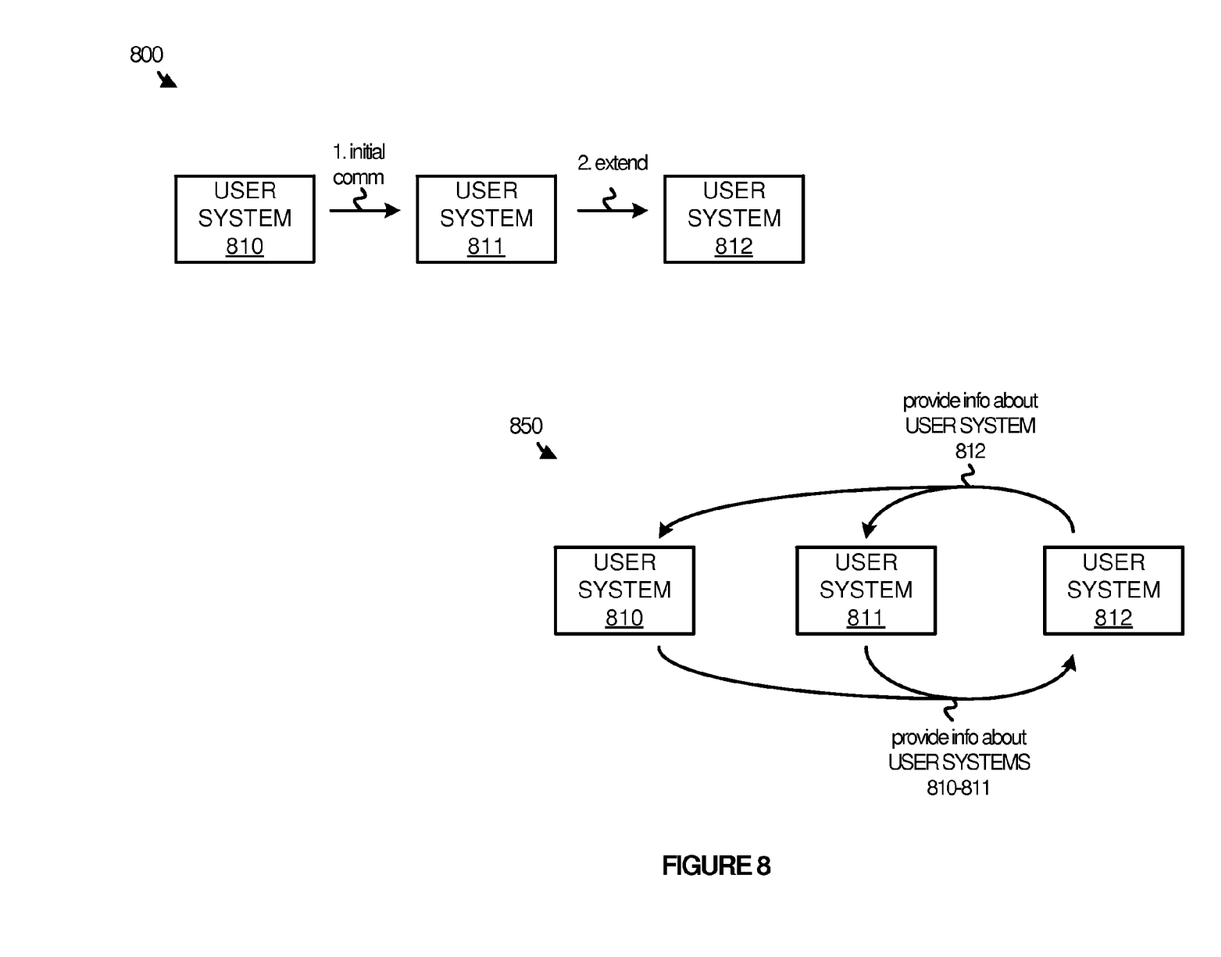
FIG. 8 illustrates an operational scenario to provide enhanced communication logs.

Referring now to FIG. 8, FIG. 8 illustrates an operational scenario to provide enhanced communication logs to end user systems. FIG. 8 includes communication flow diagram 800 and communication detail flow diagram 850. Communication flow diagram 800 is representative of a communication between user systems 810-812, and communication detail flow diagram 850 is representative of the exchange of communication details to form enhanced communication logs for each of the user systems.

As illustrated in communication flow diagram 800, user system 810 initiates a communication with user system 811. This communication may comprise a voice communication, a video communication, or some combination thereof. Once the communication is initiated by user system 810, user system 811 initiates an extension of the communication to user system 812. This extension may include a forwarding of the communication from user system 811 to user system 812, a request from user system 811 to have user system 812 join in the communication, or any other similar extension of the communication from user system 811 to user system 812.

As the communication commences between user systems 810-812, communication state information for the systems is identified to ensure accurate communication logs at the individual end user systems. In particular, using the example of communication flow diagram 800, user system 810 may be incapable of identifying the extension to user system 812. However, by collecting and distributing the communication state information for each of the systems in the communication, systems may have a more complete communication log when a communication involves three or more end user systems. In some implementations, the communication state information may be maintained in a communication server associated with the network providing the communication. However, in other implementations the actions of the server may be distributed across the devices involved in the communication.

To further illustrate the distribution of communication details during a conferenced communication, communication detail flow diagram 850 is provided. Flow diagram 850 demonstrates the flow of communication details for the conferenced communication illustrated in communication flow diagram 800. As depicted, when the communication is extended to user system 812, communication details related to user system 812 are provided to user systems 810-811. This information may include a time stamp when user system 812 joined the communication, user identifiers associated with a user of user system 812, an identifier for user system 812, such as a phone number, or any other similar information. In some implementations, user system 811 may already have access to at least a portion of the information from user system 812. Accordingly, any information provided for user system 812 may supplement the already stored information. For example, because user system 811 initiated the extend action to user system 812, user system 811 may have a communication log containing the outgoing request to user system 812. This communication log may include an identifier for user system 812 and a time stamp for when the request was initiated. However, once the communication is joined by user system 812, information may be provided to user system 811, such as an identifier for a user associated with user system 812.

In addition to providing information for user system 812 to user systems 810-811, communication details may also be provided to user system 812 about user systems 810-811. These communication details may include identifiers for the systems in the communication, identifiers for users associated with the systems, time stamp indicators for when the communication occurred, and the like. Once the communication details are received by user system 812, user system 812 may use the details to generate an accurate communication log for the communication, which can then be displayed, presented audibly, or otherwise provided to the user of user system 812. This communication log may include the initial communication from user system 810 to user system 811, and may further include the extension communication from user system 811 to user system 812.

Figure 9:
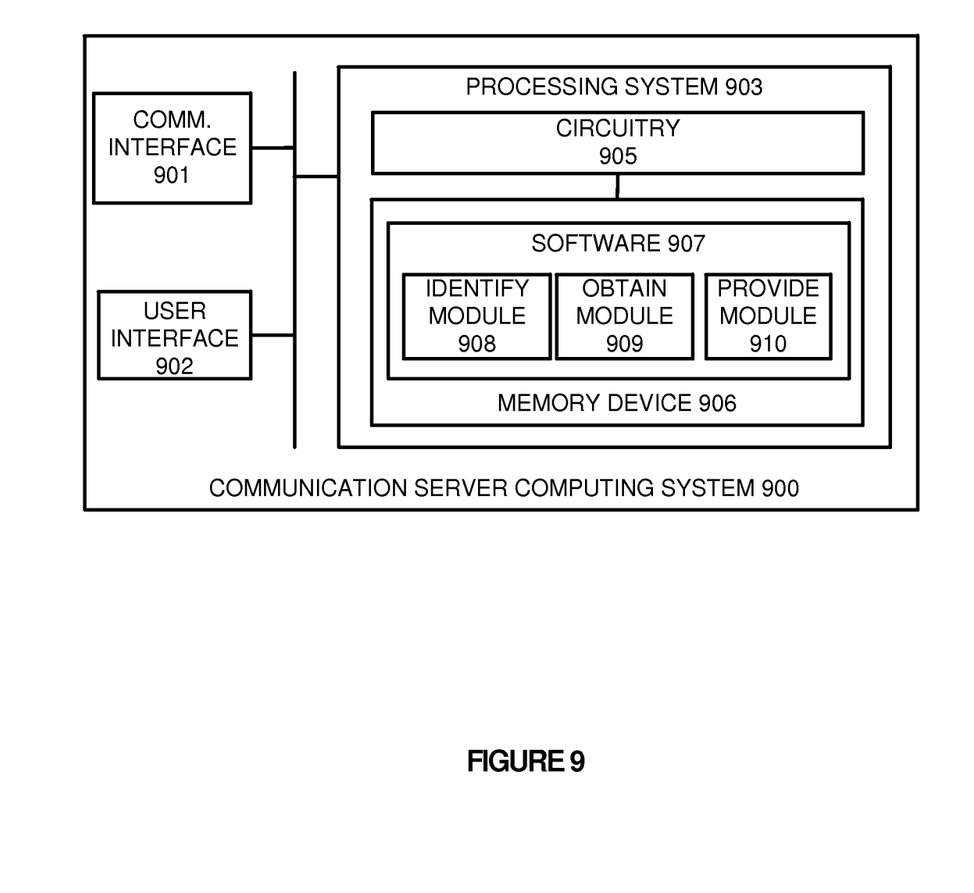
FIG. 9 illustrates a communication server computing system to provide enhanced communication logs to connecting user systems.

FIG. 9 illustrates a communication server computing system 900 to provide enhanced communication logs to connecting user systems. Communication server computing system 900 is representative of any computing system or systems with which the various operational architectures, processes, scenarios, and sequences disclosed herein for a communication server may be implemented. Communication server computing system 900 is an example of communication server 140 and communication server 940, although other examples may exist. Communication server computing system 900 comprises communication interface 901, user interface 902, and processing system 903. Processing system 903 is linked to communication interface 901 and user interface 902. Processing system 903 includes processing circuitry 905 and memory device 906 that stores operating software 907. Communication server computing system 900 may include other well-known components such as a battery and enclosure that are not shown for clarity. Computing system 900 may be a personal computer, server, or some other computing apparatus—including combinations thereof.

Communication interface 901 comprises components that communicate over communication links, such as network cards, ports, radio frequency (RF) transceivers, processing circuitry and software, or some other communication devices. Communication interface 901 may be configured to communicate over metallic, wireless, or optical links. Communication interface 901 may be configured to use Time Division Multiplex (TDM), Internet Protocol (IP), Ethernet, optical networking, wireless protocols, communication signaling, or some other communication format—including combinations thereof. In particular, communication interface 901 communicates over a network with one or more end user devices to provide the devices with updated communication log information.

User interface 902 comprises components that interact with a user to receive user inputs and to present media and/or information. User interface 902 may include a speaker, microphone, buttons, lights, display screen, touch screen, touch pad, scroll wheel, communication port, or some other user input/output apparatus—including combinations thereof. User interface 902 may be omitted in some examples.

Processing circuitry 905 comprises microprocessor and other circuitry that retrieves and executes operating software 907 from memory device 906. Memory device 906 comprises a non-transitory storage medium, such as a disk drive, flash drive, data storage circuitry, or some other memory apparatus. Processing circuitry 905 is typically mounted on a circuit board that may also hold memory device 906 and portions of communication interface 901 and user interface 902. Operating software 907 comprises computer programs, firmware, or some other form of machine-readable processing instructions. Operating software 907 includes identify module 908, obtain module 909, and provide module 910, although any number of software modules may provide the same operation. Operating software 907 may further include an operating system, utilities, drivers, network interfaces, applications, or some other type of software. When executed by processing circuitry 905, operating software 907 directs processing system 903 to operate communication server computing system 900 as described herein.

In particular, identify module 908 directs processing system 903 to identify a communication between two or more end user systems over a communication network. These systems may comprise telephones, both wired and wireless, tablet computers, laptop computer, desktop computers, and the like. Once a communication is identified, obtain module 909 directs processing system 903 to identify communication state information for each of the end user systems involved in the communication. To obtain the information, communication server computing system 900 may monitor the communications over the network, may retrieve at least a portion of the communication state information from the individual devices, may query a database containing information about the individual devices available to computing system 900, or may retrieve the information in any other similar manner.

During the communication between the two or more end user devices, identify module 908 further directs processing system 903 to identify an extension of the communication to a new end user device. This extension may comprise a forwarding or redirection of a communication from a device on the first communication to a new device, may comprise a new device being added to the communication, or may comprise any other extension of the communication. In response to identifying the extension of the communication, obtain module 909 directs processing system 903 to identify supplemental communication state information for the new end user system. This information may include how the new end user system was added to the communication, what time the new end user system was added to the communication, amongst other similar information.

Once the communication state and supplemental communication state information is obtained by communication server computing system 900, provide module 910 directs processing system 903 to transfer communication details to the systems involved in the communication based on the collected communication state information. In particular, once the communication is extended to the new user system, systems previously involved in the communication may be updated with information about the new system, including how the system was added to the communication, the time the system was added to the communication, user and identifier information associated with the new system, amongst other similar information. Similarly, the new user system may be provided with information about other systems already involved in the communication, including identifiers for the systems and personnel associated with the systems, time stamps for when the devices joined the communication, how the systems joined the communication, and the like. In some implementations, this information may be used to update the communication log at each of the devices allowing the users of the devices to recognize not only incoming and outgoing communications to the user system, but also information about other systems on the same connection.

In some examples, each of the systems that are added to a communication must implement a handshake function before data can be shared with other systems of the same conference. This handshake may include a request for authorization from the new user systems, which determines whether state information will be collected from the new systems. Accordingly, if a new user system does not authorize the collection of communication data, through either user specification or default settings of the end user system, the state information for the new user system will not be distributed to other user systems in the communication. In contrast, if the sharing of information is approved for the new end user system, information may be collected about the new system and provided to other devices in the conference.

In some implementations, updates to the communication logs at the individual devices may wait until the communication is terminated. For example, a first end user system may be added to a communication with one or more other user systems. Rather than updating the first end user system with communication details when the device joins the communication, computing system 900 may delay the transfer of the communication details when the user system leaves or terminates the communication. Upon identifying the termination of the communication, the most recent communication status data may be provided to the system as communication details. This may include information about systems that were in the communication prior to the first user system joining the communication, as well as information about user systems that joined or left the communication after the first user system joined the communication.

Returning to the elements of FIG. 1, network 110 may comprise switches, wireless access nodes, Internet routers, network gateways, application servers, computer systems, communication links, or some other type of communication equipment—including combinations thereof. This communication equipment is used to provide communication connectivity between user systems 130-135 and communication server 140.

User systems 130-135 may communicate simultaneously with one another as a conferenced communication. User systems 130-135 may each comprise a wireless phone, a computer, a tablet, a gaming system, or any other similar type of end user device. Each user system in user systems 130-135 may include communication interfaces, network interfaces, processing systems, user interfaces, computer systems, microprocessors, storage systems, storage media, or some other processing devices or software systems.

Communication server 140 comprises one or more communication interfaces, network interfaces, processing systems, computer systems, microprocessors, storage systems, storage media, or some other processing devices or software systems, and can be distributed among multiple devices. Communication server 140 may comprise one or more server computers, desktop computers, or other similar computing systems, including combinations and virtual representations thereof.

Communication links 150-152 each use metal, glass, optical, air, space, or some other material as the transport media. Communication links 150-152 may use Time Division Multiplex (TDM), asynchronous transfer mode (ATM), internet protocol (IP), Ethernet, synchronous optical networking (SONET), hybrid fiber-coax (HFC), circuit-switched, communication signaling, wireless communications, or some other communication format, including improvements thereof.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of providing enhanced communication logs, the method comprising:
   in a first end user system, maintaining a first local communication log for a communication initiated between at least the first end user system and a second end user system;
   transferring first communication state information for the first end user system from the first end user system to a communication server, wherein the second end user system transfers second communication state information fort the second end user system to the communication server;
   extending the communication to a third end user system, wherein the third end user system maintains a third local communication log for the communication and wherein the third end user system transfers supplementary communication state information for the third end user system to the communication server;
   receiving, in the first end user system from the communication server, communication details based on the first communication state information, the second communication state information, and the supplementary communication state information; and
   in the first end user system, updating the first local communication log with the communication details.

2. The method of claim 1 wherein the communication state information comprises user identifier information and communication time information for the first end user system and the second end user system, and wherein the supplementary communication state information comprises supplementary user identifier information and supplementary communication time information for the third end user system, wherein the supplementary communication time information includes a time stamp for when the third end user system joined the communication.

3. The method of claim 1 wherein extending the communication to the third end user system comprises forwarding a communication from one of the first end user system or the second end user system to the third end user system.

4. The method of claim 1 wherein extending the communication to the third end user system comprises:
transferring an invitation from one of the first end user system or the second end user system to the third end user system;
initiating the third end user system on the communication.

5. The method of claim 1 wherein extending the communication to the third end user system comprises:
identifying a request from the third end user system to join the communication; and
initiating the third end user system on the communication.

6. The method of claim 1 further comprising:
identifying a termination event for one of the first end user system, the second end user system, or the third end user system;
and
receiving, in the first end user system from the communication server, supplementary communication details based on the additional communication state information.

7. The method of claim 1 wherein the communication comprises a session initiation protocol (SIP) communication, a H.323 communication, or a public switched telephone network (PSTN) communication.

8. The method of claim 1 wherein initiating the communication for at least the first end user system and the second end user system comprises initiating a voice communication for at least the first end user system and the second end user system.

9. The method of claim 1 wherein receiving supplementary communication state information for the third end user system occurs after the communication server identifies an authorization to share status information about the third end user system.

10. An apparatus implementing a first end user system to provide enhanced communication logs, the apparatus comprising:
one or more non-transitory computer readable media;
a processing system operatively coupled with the one or more non-transitory computer readable media; and
processing instructions stored on the one or more non-transitory computer readable media that, when executed by the processing system, direct the processing system to:
maintain a first local communication log for a communication initiated between at least the first end user system and a second end user system;
transfer first communication state information for the first end user system from the first end user system to a communication server, wherein the second end user system transfers second communication state information for the second end user system to the communication server;
extend the communication to a third end user system, wherein the third end user system maintains a third local communication log for the communication and wherein the third end user system transfers supplementary communication state information for the third end user system to the communication server;
receive, from the communication server, communication details based on the first communication state information, the second communication state information, and the supplementary communication state information; and
update the first local communication log with the communication details.

11. The apparatus of claim 10 wherein the communication state information comprises user identifier information and communication time information for the first end user system and the second end user system, and wherein the supplementary communication state information comprises supplementary user identifier information and supplementary communication time information for the third end user system, wherein the supplementary communication time information includes a time stamp for when the third end user system joined the communication.

12. The apparatus of claim 10 wherein to extend the communication to the third end user system, the processing instructions direct the processing system to:
forward a communication from one of the first end user system or the second end user system to the third end user system.

13. The apparatus of claim 10 wherein to extend the communication to the third end user system, the processing instructions direct the processing system to:
transfer an invitation from one of the first end user system or the second end user system to the third end user system; and
initiate the third end user system on the communication.

14. The apparatus of claim 10 wherein to extend the communication to the third end user system, the processing instructions direct the processing system to:
identify a request from the third end user system to join the communication; and
initiate the third end user system on the communication.

15. The apparatus of claim 10 wherein the processing instructions further direct the processing system to:
identify a termination event for one of the first end user system, the second end user system, or the third end user system; and
receive, in the first end user system from the communication server, supplementary communication details based on the additional communication state information.

16. The apparatus of claim 10 wherein the communication comprises a session initiation protocol (SIP) communication, a H.323 communication, or a public switched telephone network (PSTN) communication.

17. The apparatus of claim 10 wherein to initiate the communication for at least the first end user system and the second end user system, the processing instructions direct the processing system to:
initiate a voice communication for at least the first end user system and the second end user system.

18. The apparatus of claim 10 wherein the supplementary communication state information for the third end user system is received after the communication server identifies an authorization to share status information about the third end user system.

19. One or more non-transitory computer readable media having processing instructions stored thereon for providing enhanced communication logs, the processing instructions, when executed by a processing system of a first end user system, direct the processing system to:
maintain a first local communication log for a communication initiated between at least the first end user system and a second end user system;

transfer first communication state information for the first end user system from the first end user system to a communication server, wherein the second end user system transfers second communication state information for the second end user system to the communication server;

extend the communication to a third end user system, wherein the third end user system maintains a third local communication log for the communication and wherein the third end user system transfers supplementary communication state information for the third end user system to the communication server;

receive, from the communication server, communication details based on the first communication state information, the second communication state information, and the supplementary communication state information; and update the first local communication log with the communication details.

20. The one or more non-transitory computer readable media of claim 19 wherein the communication state information comprises user identifier information and communication time information for the first end user system and the second end user system, and wherein the supplementary communication state information comprises supplementary user identifier information and supplementary communication time information for the third end user system, wherein the supplementary communication time information includes a time stamp for when the third end user system joined the communication.

* * * * *